(12) United States Patent
Shimada

(10) Patent No.: US 6,973,917 B2
(45) Date of Patent: Dec. 13, 2005

(54) THROTTLE CONTROL APPARATUS

(75) Inventor: Hiroki Shimada, Obu (JP)

(73) Assignee: Denso Corporation, (JP)

( * ) Notice: Subject to any disclaimer, the term of this patent is extended or adjusted under 35 U.S.C. 154(b) by 0 days.

(21) Appl. No.: 10/647,220

(22) Filed: Aug. 26, 2003

(65) Prior Publication Data
US 2004/0040538 A1   Mar. 4, 2004

(30) Foreign Application Priority Data
Aug. 29, 2002 (JP) .............................. 2002-250099

(51) Int. Cl.[7] .............................................. F02D 9/02
(52) U.S. Cl. ..................................... 123/399; 123/337
(58) Field of Search ............................. 123/337, 361, 123/399; 251/305–308

(56) References Cited

U.S. PATENT DOCUMENTS

| | | | |
|---|---|---|---|
| 5,979,405 A | 11/1999 | Sato et al. | ............... 123/399 |
| 6,000,377 A * | 12/1999 | Sato et al. | ............... 123/399 |
| 2002/0171059 A1 * | 11/2002 | Sakurai et al. | ............... 251/305 |

FOREIGN PATENT DOCUMENTS

| | | | |
|---|---|---|---|
| DE | 4035871 A1 | | 5/1992 |
| DE | 19912231 A1 | | 10/1999 |
| JP | 5-61448 | | 8/1993 |
| JP | 8-232787 | | 9/1996 |
| JP | 10-131772 | | 5/1998 |
| JP | 10-131773 | | 5/1998 |
| JP | 11-187604 | | 7/1999 |
| JP | 2000-8886 | * | 1/2000 |
| JP | 2000-130259 | | 5/2000 |
| JP | 2000-145482 | * | 5/2000 |

* cited by examiner

Primary Examiner—Tony M. Argenbright
(74) Attorney, Agent, or Firm—Nixon & Vanderhye PC

(57) ABSTRACT

Vibration insulators made of heatproof elastomer are integrally molded with an engine joint section of the heatproof resinous throttle body and a motor holder. Thus, engine vibration transferred from an engine intake manifold to the throttle body and the motor can be absorbed by the vibration insulators. Therefore, without increase of components and reduction of assembling workability, the vibration can be suppressed.

7 Claims, 4 Drawing Sheets

THROTTLE CONTROL APPARATUS

CROSS REFERENCE TO RELATED APPLICATION

This application is based on and incorporates herein by reference Japanese Patent Application No. 2002-250099 filed on Aug. 29, 2002.

FIELD OF THE INVENTION

The present invention is related to a throttle control apparatus of an engine to control opening of a throttle valve, which is rotatably supported on a throttle body, by driving a motor corresponding to a manipulation of a driver.

BACKGROUND OF THE INVENTION

Conventionally, a throttle control apparatus controls opening of a throttle valve to a designated opening by driving a motor corresponding to degree of stepping an accelerator pedal by a driver. Degree of stepping of the accelerator pedal is detected by an accelerator position sensor to supply current to the motor corresponding to the signal. The throttle valve driven by the motor is opened and closed to control the air intake flow to the engine.

The motor rotates the shaft of the throttle valve via a drive train such as reduction gears. The motor is accommodated in a motor case integrally molded with a throttle body rotatably supporting the shaft of the throttle valve. The motor is screwed and is fixed on the motor case at its mounting flange disposed on one end of the motor housing by mounting bolts or clamp screws. (For example, refer to Japanese Patent Application Publications No. 10-252510, and 10-131772.)

However, vibration of an engine is transmitted to the throttle body directly. Thus, components such as the motor and the gears are made to be highly rigid to endure the vibration. As shown in FIG. 6, such an assembling work is necessary that attachment of a vibration insulative leaf spring 103 between the bottom side of a motor case 104 and the opposing surface of a motor 102 by press-insertion or the like. The vibration insulative leaf spring 103 is to avoid transmitting of the engine vibration to the motor 102 via a throttle body 101.

Furthermore, on the motor housing, a motor mounting flange need to be screwed and fixed. The motor mounting flange and the motor housing are formed integrally. To acquire enough strength, the wall thickness of the motor housing is increased. As a result, the weight of the motor unit is increased. Thus, if engine vibration is transmitted to the motor, hefty load is generated. The motor vibrates intensely, thus, engagement can cause failure between a gear of a motor spindle and a reduction gear. An armature inside the motor vibrates intensely, and the motor shaft tends to fail to rotate.

SUMMARY OF THE INVENTION

In view of foregoing problems, it is the objective of the present invention is to propose a vibration insulating throttle apparatus without increase of components and reduction of assembling workability.

To a throttle body, which supports a shaft of a throttle valve rotatably, a vibration insulator is formed integrally to suppress vibration transferred from the engine to the throttle body.

A joint section is integrally molded with the throttle body and is connected with an intake manifold. Near the joint section, a vibration insulator is disposed to suppress the vibration. Thus, an additional vibration insulator need not be built in the throttle. To reduce components, preferably, the vibration insulator is integrally formed with the joint section.

An airtight seal section between the sidewall of the engine and the mounting flange of the throttle body is integrally formed with the vibration insulator to reduce sealing members.

The vibration insulator is integrally formed with the throttle body, which rotatably supports the shaft of the throttle valve and accommodates the motor.

A motor holder is integrally formed with the throttle body to lock the motor. Nearby the motor holder, the vibration insulator is disposed to suppress the vibration. Thus, additional insulative spring or the like need not be built in the motor by press-insertion or the like.

An elastically deformable snap hook is disposed on a motor case or is disposed on a motor cover to support the motor. Then, the motor can be fixed by elastic force of the vibration insulator and the snap hook. Thus, mounting bolts and clamp screws for screwing the motor mounting flange to the motor case is not needed. Furthermore, the motor mounting flange need not be integrally formed with the motor housing. Therefore, weight of the motor unit can be reduced. For reduction of components and weight, preferably, the motor case is integrally molded with resin on the side wall of the bore section of the throttle body.

The throttle body is integrally molded with heatproof resin or metal or is aluminum die-cast, and the vibration insulator is integrally molded with elastically deformable heatproof resin on the throttle body, so that the number of components can be reduced comparing with attaching of an additional vibration insulator to the throttle body.

Thus, the number of components can be decreased and assembling workability can be improved so that cost can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1A:
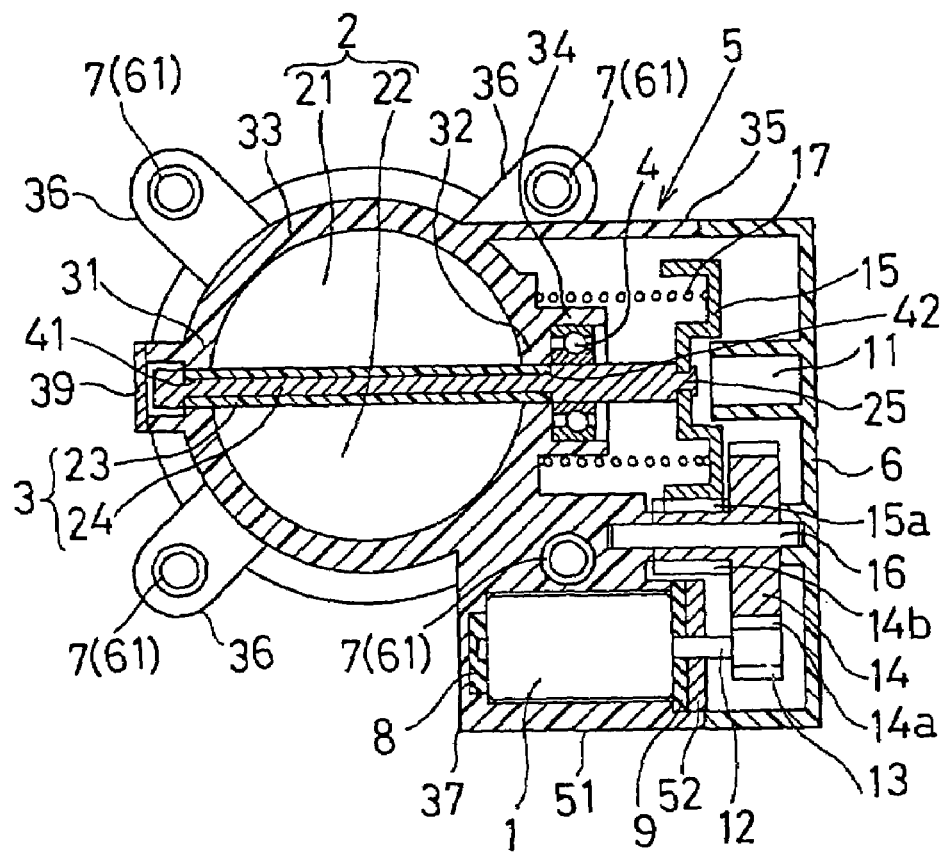
FIG. 1A is a cross-sectional view showing overall structure of a throttle control apparatus of an engine.

In the first embodiment shown in FIG. 1A, a throttle control apparatus of an engine comprises a motor 1, which structures an actuator; reduction gears (13, 14, 15), which decelerate the rotation speed of the motor 1 by a predetermined reduction ratio; a throttle valve 2, which is driven to rotate by the motor 1 via the reduction gears; a throttle body 5, which rotatably supports a shaft 3 (spindle section, valve shaft) of the throttle valve 2 via a ball bearing 4 and rigidly accommodates the motor 1; a sensor cover 6, which encloses the opening side of the throttle body 5; and an engine control apparatus (engine control unit: ECU), which controls the rotation speed of the engine by driving of the motor 1 corresponding to the manipulation degree by a driver (the stepping degree of an accelerator pedal) so that the opening of the throttle valve 2 is controlled to corresponding opening degree. In an intake manifold 10, an air intake passage 70 is formed to connect an air intake passage 30 formed in the throttle body 5 and a combustion chamber of each cylinder of the engine.

Here, an accelerator position sensor (not shown) is wired with the ECU. The accelerator position sensor converts the stepping degree of the accelerator pedal by the driver into electric signals (accelerator position signals), and transmits the accelerator position signals to the ECU. The throttle control apparatus has a throttle position sensor (not shown) to convert the opening of the throttle valve 2 into an electric signals (throttle opening signals) and to transmit the throttle opening signals of the throttle valve 2 to the ECU.

In this embodiment, the ECU is structured to perform feedback control (PID control: proportional integral differential control) for the motor 1 to eliminate the deviation between the throttle opening signal from the throttle position sensor and the accelerator position signal from the accelerator position sensor. The sensor cover 6 is made of electrically insulative resin to insulate each external connection terminals of the throttle position sensor and each power supply terminal for the motor 1. The sensor cover 6 has a concave sensor holder 11 to rigidly lock the throttle position sensor.

The motor 1 is a driving source, and has plural permanent magnets, armature core, armature coils and so on in the motor housing. The reduction gears have a pinion gear 13 fixed to the outer periphery of the power spindle 12 of the motor 1; an intermediate reduction gears 14, which rotate as engaging with the pinion gear 13; and a rotation member (rotor core) 15 which rotates as engaging with the intermediate reduction gears 14. The intermediate reduction gears 14 are integrally molded with metal or resin, and are rotatably fixed on the outer periphery of a supporting shaft 16 which is a rotation center. The intermediate reduction gears 14 have a large diameter gear 14a engaging the pinion gear 13 and a small diameter gear 14b engaging the reduction gear 15a of the rotation member 15. One axial end of the supporting shaft 16 is press-inserted into a concavity formed in the inner wall of the throttle body 5. Here, the pinion gear 13 and the intermediate reduction gears 14 are rotation power transmission means to transmit rotation power of the motor 1 to the reduction gear 15a of the rotation member 15.

The rotation member 15 is formed in a predetermined approximately ring-shape with metal. In the outer periphery of the cylindrical section of the rotation member 15, the reduction gear 15a is formed to engage with the small-diameter gear 14b of the intermediate reduction gears 14. In the inner periphery of the cylindrical section of the rotation member 15, permanent magnets (not shown) are bonded with glue or the like opposing against the outer periphery of the throttle position sensor. In the center of the rotation member 15, a through-hole is formed. The right end section of a reinforcing member 24 (described below) in FIG. 1A penetrates the through-hole. Subsequently, the right end section of the reinforcing member 24 in FIG. 1A (reduction gear clamp section 25) is crimped so that the rotation member 15 is fixed with the right end section of the shaft 3 in FIG. 1A. Between the left end surface of the cylindrical section of the rotation member 15 in FIG. 1A and the outer wall surface of the bore wall section 33 (the right end surface in FIG. 1A), a coil-shaped return spring 17 is disposed to set the throttle valve 2 and its shaft 3 back to the initial position when the engine is in idling rotation speed.

The throttle valve 2 is a butterfly-type rotary valve to control intake air flow fed into the engine. The throttle valve 2 comprises the first semicircular plate section 21 extended from the top end surface of the shaft 3 upward in FIG. 1A and the second semicircular plate section 22 extended from the bottom end surface of the shaft 3 downward in FIG. 1A. The shaft 3 has a cylindrical resinous molded section 23 integrally molded with heatproof resin and the reinforcing member (metallic center core member) 24 to reinforce the resinous molded section 23.

As shown in FIG. 1A, the throttle body 5, which is integrally molded with heatproof resin, structures a part of an engine air intake pipe connecting with the engine intake manifold 10, and rotatably supports the throttle valve 2. This throttle body 5 has an annular bore wall section 33. Inside of the bore wall section 33, approximately circular air intake passage 30, in which intake air flows to the engine, is formed.

In the bore wall section 33 of the throttle body 5, a first cylindrical shaft bush 31, and a second cylindrical shaft bush 32 and a cylindrical bearing holder 34 are disposed. The second cylindrical shaft bush 32 rotatably supports the first supported section and the second supported section of the shaft 3. The cylindrical bearing holder 34 rotatably supports the second supported section of the shaft 3 via the ball bearing 4. Inside of the first shaft bush 31 and the second shaft bush 32, a first circular shaft through-hole 41 and a second circular shaft through-hole 42 are formed so that the shaft 3 of the throttle valve 2 passes through. At the left end of the first shaft bush 31 in FIG. 1A, a plug 39 is fit to block the opening of the first shaft bush 31.

On the sidewall of the bore wall section 33, container-shaped gear case 35 is integrally formed with heatproof resin to rotatably accommodate the rotation member 15 including the reduction gear 15a. At the opening side of the gear case 35, a sensor cover 6 made of highly electrically insulative resin, is disposed. In the internal space formed between the gear case 35 and the sensor cover 6, the reduction gears are rotatably accommodated On the outer periphery of the bore wall section 33, engine joint sections (mounting flange, mount section on the engine, installation section on the engine) 36 are integrally molded with heatproof resin so that the engine joint sections 36 radially extends.

Figure 2:
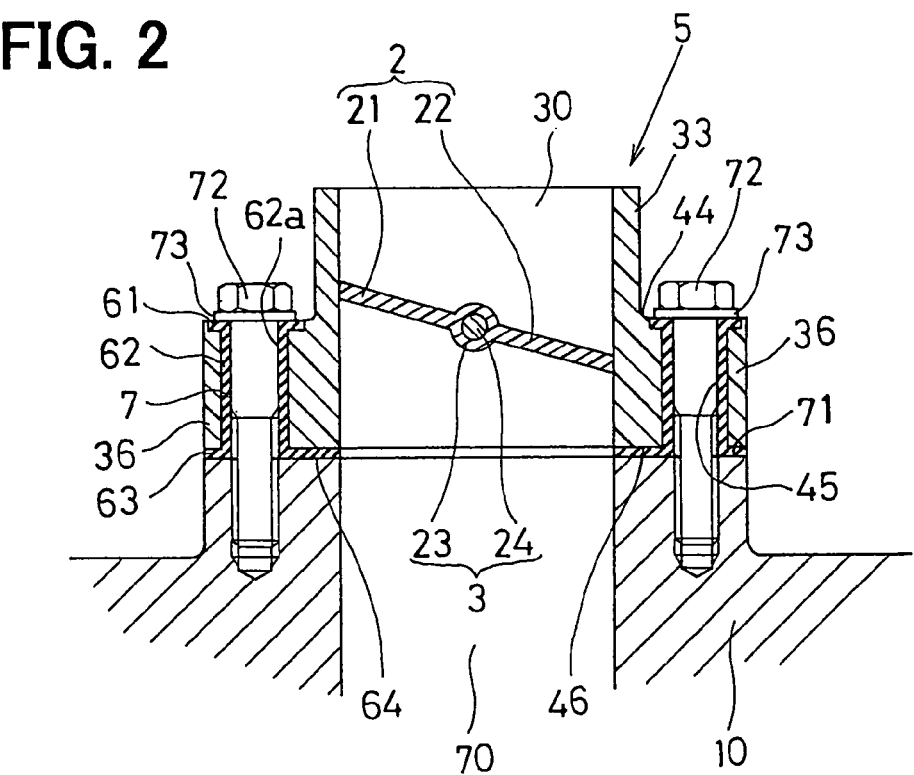
FIG. 2 is a cross-sectional view showing an engine joint section of the throttle body (the first embodiment)

As shown in FIG. 2, at the engine joint sections 36, the throttle body 5 is mounted on a joint end face 71 of the engine intake manifold 10 with clamping members such as plural clamp bolts 72 and plural washers 73 or the like. As shown in FIG. 1A, the engine joint sections 36 radially extend outward from outer periphery of the bore wall section 33.

As shown in FIG. 2, on the top end face (bolt flange face) 44 in FIG. 2 of the engine joint section 36, on inner peripheral surface of the through-hole 45 in which the clamp bolt 72 passes through, and on the bottom end face (mounting flange face) 46 in FIG. 2 corresponding to a joint end face 71 of the engine intake manifold 10, a flange vibration insulator 7 is integrally formed with resin (two colored molding) to enhance vibration insulation property of the throttle body 5.

Figure 1B:
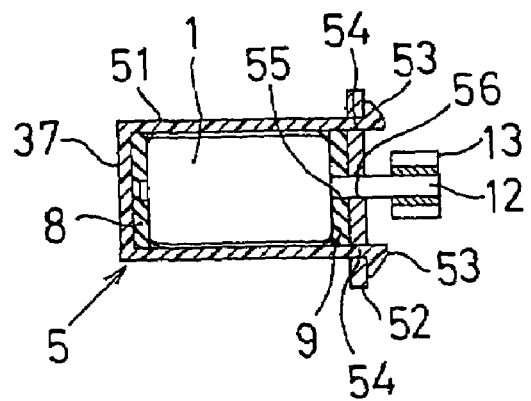
FIG. 1B is a cross-sectional view showing a motor holder of the throttle body, and a motor (first embodiment)

As shown in FIG. 1A, at the sidewall of the bore wall section 33, and on the lower side of the gear case 35 in FIG. 1A, a motor holder 37 is integrally formed with heatproof resin to lock the motor 1. As shown in FIG. 1B, the motor holder 37 internally has a bottomed cylindrical motor case 51 to accommodate the motor 1, a motor cover 52 to plug the opening side of the motor case 51, and a bottom vibration insulator 8 and a ceiling vibration insulator 9 to enhance vibration-proof property of the motor 1. That is, as well understood from FIGS. 1A and 1B, the motor 1 is remotely supported by the throttle body 5 via the vibration insulators 8,9.

On the motor case 51, plural detent claws (snap hooks) 53 are formed to accommodate and to support the motor 1 and the motor cover 52. The detent claws 53 are hooked on right side end of the motor cover 52 in FIG. 1B by its elastically deformable section as penetrating plural insertion holes 54 formed in the motor cover 52. In the center of the motor cover 52 and the insulator 9, through-holes 55, 56 are formed so that the power spindle 12 of the motor 1 penetrates the through-holes 55, 56. The motor cover 52 can be fixed on the opening side of the motor case 51.

The flange vibration insulators 7, the bottom vibration insulator 8 and the ceiling vibration insulator 9 are integrally formable with the heatproof resinous member of the throttle body 5, and are made of elastically deformable heatproof elastomer. AS the heatproof elastomer, for example, high density nytril butadiene rubber (H-NBR), nytril butadiene rubber (NBR), silicone rubber, ethylene propylene diene monomer (EPDM), acrylate resin, poly urethane resin (PUR), elastomer and so on can be used.

As shown in FIG. 2, the flange vibration insulator 7 is integrally formed with resin (molded in two colors) on the engine joint section 36 of the throttle body 5, and has an approximately ring-shaped bolt seat 61 on which the head section of the clamp bolts 72 contacts; a cylindrical section 62 extended from the bolt seat 61 downward in FIG. 2; and annular section 63 extended in the radial direction of the bore wall section 33 from the lower end section of the cylindrical section 62 in FIG. 2 and contacting the joint face 71 of the engine intake manifold 10, and so on. On the flange vibration insulator 7, a ring-shaped seal section 64 is formed between the engine joint section 36 and the joint end face 71 of the intake manifold 10 to avoid leakage of intake air.

In each of the cylindrical section 62, insertion hole 62a is internally formed so that the shaft of the clamp bolt 72 is inserted into the insertion hole 62a.

As shown in FIG. 1B, the bottom vibration insulator 8 is integrally formed with resin (molded in two colors) on the left side end face of the motor case 51 in FIG. 1B (motor mounting face, bottom face). The ceiling vibration insulator 9 is insert-molded on the left side end face of the motor cover 52 in FIG. 1B (motor mounting face, top face).

Figure 3:
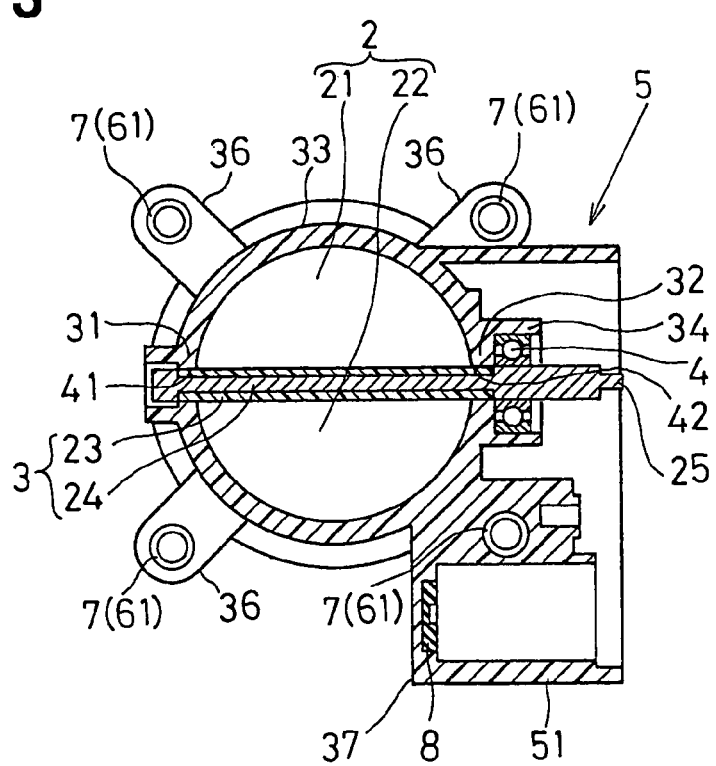
FIG. 3 is a cross-sectional view showing throttle valve and its shaft of a throttle control apparatus of an engine. (the first embodiment)

As shown in FIG. 3, in a cavity formed by a resin molding dies including a sliding die to mold the air intake passage 30 (refer to FIG. 2) and a sliding die, which is for molding the first shaft through-hole 41 and the second shaft through-hole 42, heat-melt heatproof resin is injected from one or two or more gates, and inside of the cavity of the molding die is formed with heatproof resin. The heatproof resinous member filled in the molding die is taken out, cooled and hardened (solidified), or the heatproof resinous member is cooled and hardened (solidified) in the molding dies. Thus, a resinous molded member is formed including the first shaft bush 31; the second shaft bush 32; the bore wall section 33; the bearing holder 34; the gear case 35; the engine joint section 36 and the motor holder 37.

In a cavity formed by the resin molding dies, the cooled and hardened resinous molded member is put. Heated and melt heatproof elastomer is injected from one or two or more gates. Then, in a gap between the resin molding dies and the resinous molded member, the melt heatproof elastomer is injected and filled. The resinous molded member and the heatproof elastomer are taken out of the cavity of the molding dies and cooled, or the resinous member and the heatproof elastomer in the cavity of the molding dies are cooled. Thus, the bottom vibration insulator 8 is integrated with the resinous molded member to be the throttle body 5 molded in two colors. As shown in FIG. 1B, the ceiling vibration insulator 9 is also molded in two colors to be integrated with the motor cover 52 in the same manner as the bottom vibration insulator 8. (Or, the ceiling vibration insulator 9 is bonded to the motor cover 52.

The motor 1 is attached in the motor case 51 of the throttle body 5. The motor cover 52 with the bottom vibration insulator 9 is attached so that the power spindle 12 of the motor 1 penetrates the through-hole 55, 56. Then, as the plural insertion holes 54 formed in the motor cover 52 are penetrated by the plural detent claws 53 formed on the motor case 51, the motor cover 52 is attached on the opening side of the motor case 51.

Thus, the left end section of the motor 1 in FIG. 1B (the rear section of the motor 1) receives elastic force from the bottom vibration insulator 8 added on the bottom face of the motor case 51, the right end section of the motor 1 in FIG. 1A (the front section of the motor 1) receives elastic force from the ceiling vibration insulator 9 added on the ceiling face of the motor cover 52. The motor cover 52 presses the motor 1 via the ceiling vibration insulator 9. The motor cover 52 is pushed back by reactive force of the bottom vibration insulator 8 and the ceiling vibration insulator 9, and is held by the plural detent claws 53. Thus, vibration-proof property of the motor 1 locked between the motor holder 37, that is the bottom face of the motor case 51 (the motor mounting face), and the ceiling face of the motor cover 52 (the motor mounting face) can be enhanced.

When a driver steps and presses an accelerator pedal, accelerator position signals from the accelerator position sensor are input to the ECU. By the ECU, the motor 1 shown in FIG. 1 is energized, and the power spindle 12 of the motor 1 rotates so that opening of the throttle valve 2 becomes a designated opening degree. By rotation of the power spindle 12, the pinion gear 13 rotates. The rotation power is transmitted to the large diameter gear 14a of the intermediate reduction gears 14. When the small diameter gear 14b rotates around the supporting shaft 16 accompanied by the rotation of the large diameter gear 14a, the rotation member 15 rotates with its reduction gear 15a being engaged with the small diameter gear 14b. Thus, the rotation member 15 rotates with the shaft 3, and the shaft 3 rotates by designated angle so that the throttle valve 2 is kept in designated angle in the air intake passage 30 formed in the throttle body 5 toward the engine.

Shown in FIG. 2, the flange vibration insulator 7 made of heatproof elastomer and the engine joint section 36 of the throttle body 5, which is integrally formed with heatproof resin, are screwed with the plural clamp bolts 72 onto the joint end face 71 of the engine intake manifold 10. By the flange vibration insulator 7 added on the engine joint section 36 of the throttle body 5, engine vibration transferred from the engine intake manifold 10 can be absorbed. Thus, vibration of the throttle body 5 can be suppressed. As a result, vibration-proof property of the entire throttle control apparatus can be improved.

As shown in FIG. 1A, by the bottom vibration insulator 8 added on the bottom face (motor mounting face) of the motor case 51 of the motor holder 37, and the ceiling vibration insulator 9 added on the ceiling face (motor mounting face) of the motor cover 52, the motor 1 is locked between the motor holder 37 and the motor cover 52. Thus, if engine vibration is transferred to the motor holder 37, the engine vibration can be absorbed. Thus, vibration of the motor 1 can be suppressed and the motor 1 does not vibrate largely so that vibration-proof property of the motor 1 can be enhanced. Thus, engagement incomplete between the pinion gear 13 disposed on the power spindle 12 and the large diameter gear 14a of the intermediate reduction gears 14 does not occur. Therefore, via the reduction gears, the rotation power of the motor 1 can be stably transmitted to the throttle valve 2 and its shaft 3. Thus, the opening of the throttle valve 2 is set to aimed angle so that the intake air flow to the engine becomes desired rate. The controllability of the opening of the throttle valve 2 by the throttle control apparatus can be enhanced so that engine rotation speed corresponding to the degree of stepping the accelerator pedal can be obtained.

The bottom vibration insulator 8 and the ceiling vibration insulator 9 added on the motor holder 37 of the throttle body 5 need not be independently assembled. Because the bottom vibration insulator 8 is two-color molded on the bottom face (motor mounting face) of the motor case 51, and the ceiling vibration insulator 9 is integrally fixed on the ceiling face (motor mounting face) of the motor cover 52.

As shown in FIG. 2, the flange vibration insulator 7 need not be independently assembled between the mounting flange face 46 of the engine joint section 36 and the joint end face 71 of the engine intake manifold 10.

Furthermore, the flange vibration insulator 7 need not be independently assembled on the bolt flange face 44 and on the insertion hole 45 of the engine joint face 36 of the throttle body 5.

As shown in FIG. 1B, the motor cover 52 is pushed back by the reactive force of pushing of the ceiling vibration insulator 9, and is held by the plural detent claws 53 integrally formed on the motor case 51. Thus, bolts and screws for locking the motor 1 on the motor holder 37 are not necessary. The number of the components is decreased, and assembling workability can be improved. Therefore, cost can be reduced, and productivity can be improved.

By eliminating a mounting flange integrally formed on a motor housing of the motor 1, production cost of the motor 1 itself can be reduced. Without forming the mounting flange on the motor housing of the motor 1, the rear end section of the motor 1 is elastically pushed by the bottom vibration insulator 8 added on the motor mounting face of the motor case 51, and the front end section of the motor 1 is elastically pushed by the ceiling vibration insulator 9 added on the motor cover 52. Thus, the motor 1 can be locked on the motor holder 37.

Figure 4:
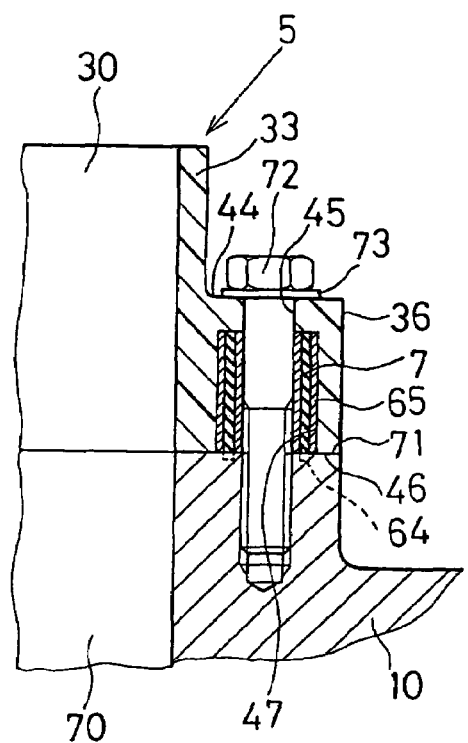
FIG. 4 is a cross-sectional view showing the engine joint section of the throttle body (second embodiment)

In the second embodiment shown in FIG. 4, in each engine joint section 36 of the throttle body 5, the bolt flange face 44; the insertion hole 45 in which the clamp bolt 72 passes through; and the mounting flange 46 corresponding to the joint end face 71 of the engine intake manifold 10 are formed. The insertion hole 45 is formed so that its inner diameter of the lower end side (the engine side) is formed larger than that of the upper end side (opposite side of the engine) in FIG. 4. In the larger insertion hole 47, to enhance vibration-proof property of the throttle body 5, plural cylindrical vibration insulators 7 (flange vibration insulators) are integrally molded with resin (two colored molding) at plural places.

Each flange vibration insulator 7 is molded with resin in each metallic cylindrical reinforcing member 65 made of iron or the like in order to avoid buckling deformation or the like of the engine joint section 36 by the axial force of the clamp bolts 72. That is, each reinforcing member 65 integrated with the flange vibration insulator 7 is insert-molded in the heatproof resinous member which forms the engine joint section 36. From the lower end of the flange vibration insulator 7 in FIG. 4, a ring-shaped seal section 64 is formed to protrude toward lower direction in FIG. 4 to avoid leakage of intake air from between the throttle body 5 and the joint end face 71 of the intake manifold 10.

Figure 5:
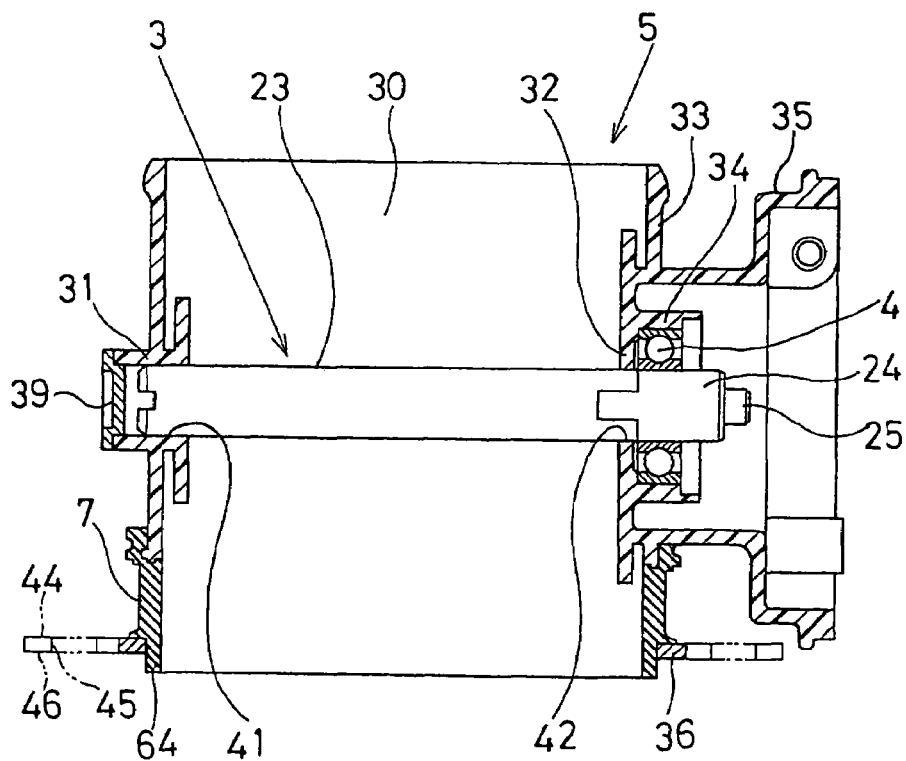
FIG. 5 is a cross-sectional view showing the engine joint section of the throttle body (the third embodiment)
Figure 6:
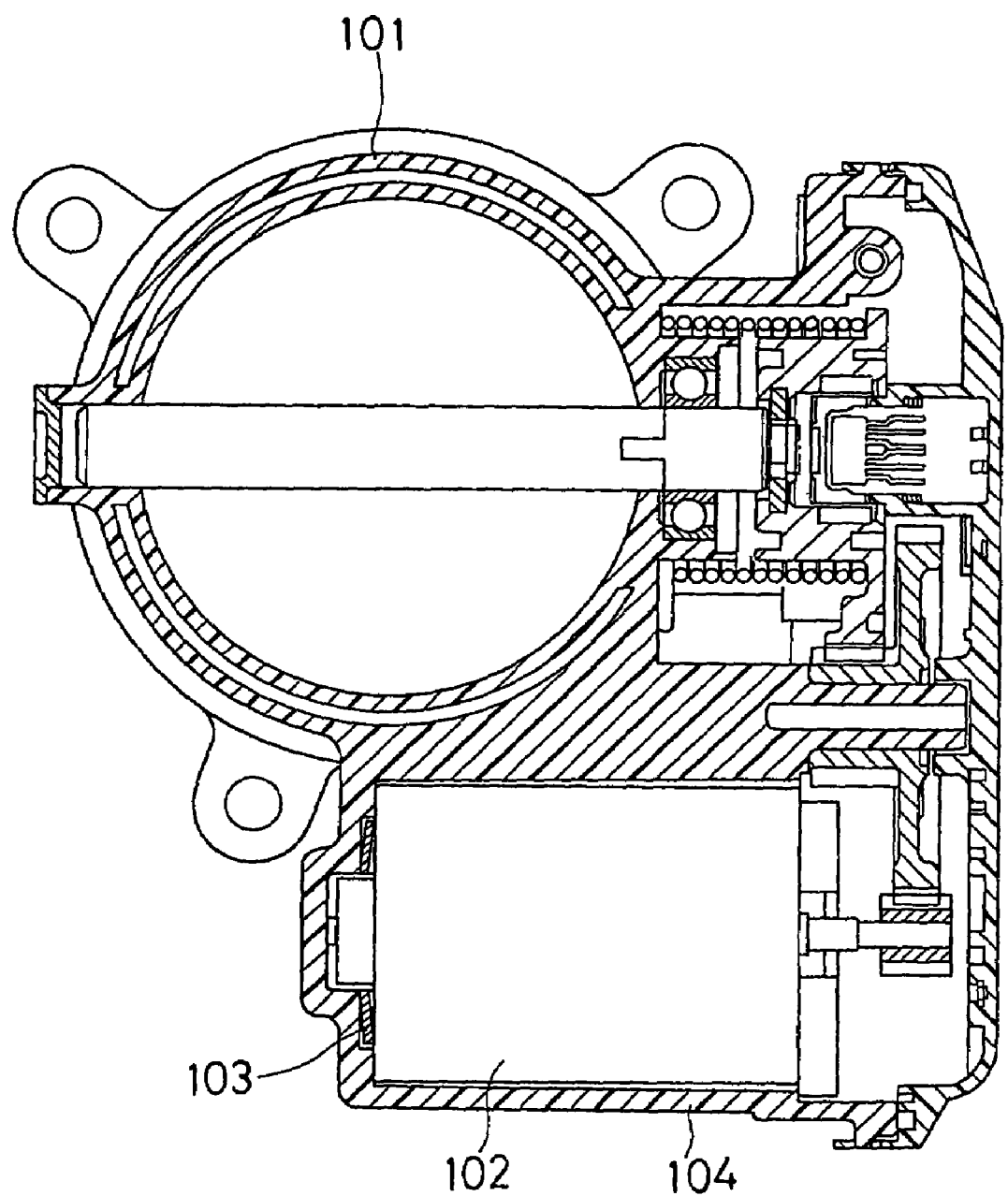
FIG. 6 is a cross-sectional view showing overall structure of a throttle control apparatus of an engine (related art).

In the third embodiment as shown in FIG. 5, the throttle body 5 made of heatproof resin and engine joint section 36 made of metallic plate are separately formed. Before mounting the throttle body 5 on the joint end face 71 of the engine intake manifold 10 (refer to FIG. 2), the throttle body 5 and the engine joint section 36 made of metallic plate are integrated.

The engine joint section 36 has the bolt flange face 44, the insertion hole 45 and the mounting flange face 46. The engine joint section 36 is bonded with an approximately cylindrical flange vibration insulator 7 to enhance vibration-proof property of the throttle body 5. From the lower side end of the flange vibration insulator 7 in FIG. 5, a ring-shaped seal section 64 is formed to protrude downward in FIG. 5 to avoid leakage of intake air from between the throttle body 5 and the joint end face 71 of the intake manifold 10.

In this embodiment, the shaft 3 of the throttle valve 2 is rotatably supported by the bearing holder 34 of the throttle body 5 via ball bearings 4. On the right side end face of the reinforcing member 24 in FIG. 5, a reduction gear clamp section 25 is disposed to lock the rotation member 15 by crimping.

The degree of stepping of the accelerator pedal can be mechanically transmitted to the throttle valve 2 and its shaft 3 via a wire cable and an acceleration lever so that the throttle valve 2 and its shaft 3 are actuated.

Referring to FIG. 1, the bottom vibration insulator 8 added on the motor mounting face of the motor holder 37 of the throttle body 5 or the ceiling vibration insulator 9 can be integrally formed with resin or integrated with the motor mounting face of the motor case 51 or the motor mounting face of the motor cover 52.

As shown in FIG. 2, The flange vibration insulator 7 can be integrally formed with resin with the engine joint section 36 to be disposed just between the mounting flange face 46 of the engine joint section 36 of the throttle body 5 and joint end face 71 of the engine intake manifold 10. The resinous member, which structures the throttle body 5, and the flange vibration insulators 7 and the bottom vibration insulator 8 can be molded simultaneously.

The throttle body 5 can be integrally formed with metal or can be formed by aluminum die-casting.

The throttle valve 2 and its shaft 3 can be integrally formed with such metal that iron or the like.

The throttle valve 2 and the shaft 3 can be formed separately and the throttle valve 2 can be screwed on the shaft 3 using threads such as mounting bolts or clamp screws. By resinous molding of the rotating member 15, which has the reduction gears 15a, the rotating member 15 can be integrally molded with resin on the resinous molded section 23 of the shaft 3 of the throttle valve 2.

The flange vibration insulator 7, the bottom vibration insulator 8 and the ceiling vibration insulator 9 can be formed separately from the throttle body 5, and can be supported by external force.

Various modifications and alternation may be made to the above embodiments without departing from the spirit of the present invention.

What is claimed is:

1. A throttle control apparatus comprising:
   a motor for generating rotation power;
   a throttle valve having a shaft driven by the rotation power of the motor for controlling air intake flow fed to the engine;
   a throttle body rotatably supporting the shaft of the throttle valve and accommodating the motor;
   a vibration insulator for suppressing vibration transferred from the engine to the motor,
   wherein the vibration insulator is integrated with the throttle body; and
   a motor holder positioned to lock the motor and integrated with the throttle body,
   wherein the insulator is disposed near the motor holder.

2. A throttle control apparatus according to claim 1, further comprising:
   a motor holder positioned to lock the motor and integrally formed on the throttle body;
   a motor case included in the motor holder and accommodates the motor;
   a motor cover included in the motor holder and supports the motor; and
   an elastically deformable snap hook included in one of the motor case and the motor cover,
   wherein the motor is supported by elastic force of the vibration insulator and the snap hook.

3. A throttle control apparatus according to claim 1, wherein the motor is remotely supported by the throttle body.

4. A throttle control apparatus according to claim 1, wherein the throttle body is formed with heatproof resin or aluminum die-cast, and the vibration insulator is made of elastically deformable heatproof resin.

5. A throttle control apparatus comprising:
   a motor for generating rotation power;
   a throttle valve having a shaft driven by the rotation power of the motor for controlling air intake flow fed to the engine;
   a throttle body rotatably supporting the shaft of the throttle valve and accommodating the motor;
   a vibration insulator for suppressing vibration transferred from the engine to the motor, wherein the vibration insulator is integrated with the throttle body;
   a motor holder positioned to lock the motor and integrally formed on the throttle body;
   a motor case included in the motor holder and accommodating the motor; a motor cover included in the motor holder and supporting the motor; and
   an elastically deformable snap hook included in one of the motor case and the motor cover,
   wherein the motor is supported by elastic force of the vibration insulator and the snap hook.

6. A throttle control apparatus according to claim 5, wherein the motor is remotely supported by the throttle body.

7. A throttle control apparatus according to claim 5, wherein the throttle body is formed with heatproof resin or aluminum die-cast, and the vibration insulator is made of elastically deformable heatproof resin.

* * * * *